United States Patent
Hammond et al.

(10) Patent No.: US 9,534,830 B2
(45) Date of Patent: Jan. 3, 2017

(54) TRANSPARENT TINTED COATING FOR APPLIANCE EXTERIOR PANELS TO ALLOW FOR TINTED SURFACE PATTERNS AND A PROCESS FOR APPLICATION OF COATING

(71) Applicant: Whirlpool Corporation, Benton Harbor, MI (US)

(72) Inventors: Richard L. Hammond, Grand Haven, MI (US); Jessica R. McConnell, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1 day.

(21) Appl. No.: 14/573,824

(22) Filed: Dec. 17, 2014

(65) Prior Publication Data

US 2016/0178271 A1 Jun. 23, 2016

(51) Int. Cl.
| | |
|---|---|
| F25D 23/08 | (2006.01) |
| C09D 167/00 | (2006.01) |
| F25D 23/02 | (2006.01) |
| F25D 23/06 | (2006.01) |
| B05D 1/00 | (2006.01) |
| C08K 3/04 | (2006.01) |

(52) U.S. Cl.
CPC ............... *F25D 23/08* (2013.01); *B05D 1/00* (2013.01); *C09D 167/00* (2013.01); *F25D 23/028* (2013.01); *F25D 23/065* (2013.01); *C08K 3/04* (2013.01); *F25D 2400/18* (2013.01); *Y10T 428/31678* (2015.04)

(58) Field of Classification Search
CPC ............. B32B 15/04; B05D 7/14; B05D 5/00; B05D 5/067; B05D 2202/15; Y10T 428/31678; F25D 23/08; C09D 167/00; C08K 3/04
See application file for complete search history.

(56) References Cited

U.S. PATENT DOCUMENTS

| | | | |
|---|---|---|---|
| 4,842,945 A | * | 6/1989 | Ito .......................... C23C 16/26 204/192.11 |
| 5,254,395 A | | 10/1993 | Hodnett, III |
| 5,387,473 A | | 2/1995 | Yoshimi et al. |

(Continued)

FOREIGN PATENT DOCUMENTS

| | | |
|---|---|---|
| DE | 10236349 | 2/2004 |
| EP | 1834759 | 9/2009 |

(Continued)

*Primary Examiner* — Bethlehem Shewareged

(57) ABSTRACT

An exterior panel for a kitchen appliance includes a metallic substrate having a predetermined surface pattern on at least one side of the metallic substrate, wherein the metallic substrate is formed to include a predetermined contour. A coating layer is an organic paint coating composition on the at least one side of the metallic substrate, the coating layer including a predetermined color and a fingerprint resistive surface, wherein the coating layer is at least partially translucent such that the predetermined surface pattern is visible with the naked eye through the coating layer, and wherein the predetermined surface pattern is modified by the coating layer to reflect the combination of the predetermined surface pattern and the predetermined color of the coating layer.

17 Claims, 7 Drawing Sheets

(56) References Cited

U.S. PATENT DOCUMENTS

| | | | |
|---|---|---|---|
| 6,720,065 B1 * | 4/2004 | Cosentino | B32B 27/00 156/308.2 |
| 6,730,361 B2 | 5/2004 | Parekh et al. | |
| 7,279,218 B2 | 10/2007 | Watase et al. | |
| 7,875,318 B2 | 1/2011 | Borovik et al. | |
| 8,663,793 B2 | 3/2014 | Jo et al. | |
| 8,715,837 B2 | 5/2014 | Tada et al. | |
| 9,296,919 B2 | 3/2016 | Morishita et al. | |
| 2003/0125457 A1 | 7/2003 | Schafheutle et al. | |
| 2003/0190434 A1 | 10/2003 | Byers et al. | |
| 2004/0005471 A1 | 1/2004 | Sugita et al. | |
| 2005/0154118 A1 | 7/2005 | Hayes et al. | |
| 2006/0063872 A1 * | 3/2006 | Teachout | C09D 5/084 524/417 |
| 2007/0125451 A1 | 6/2007 | Smith et al. | |
| 2007/0218301 A1 * | 9/2007 | Pachuta | B05D 7/14 428/457 |
| 2009/0022617 A1 * | 1/2009 | Kim | C21O 5/5264 420/58 |
| 2013/0089719 A1 | 4/2013 | Park et al. | |

FOREIGN PATENT DOCUMENTS

| | | |
|---|---|---|
| EP | 2987836 | 2/2016 |
| GB | 2327050 | 1/1999 |

* cited by examiner

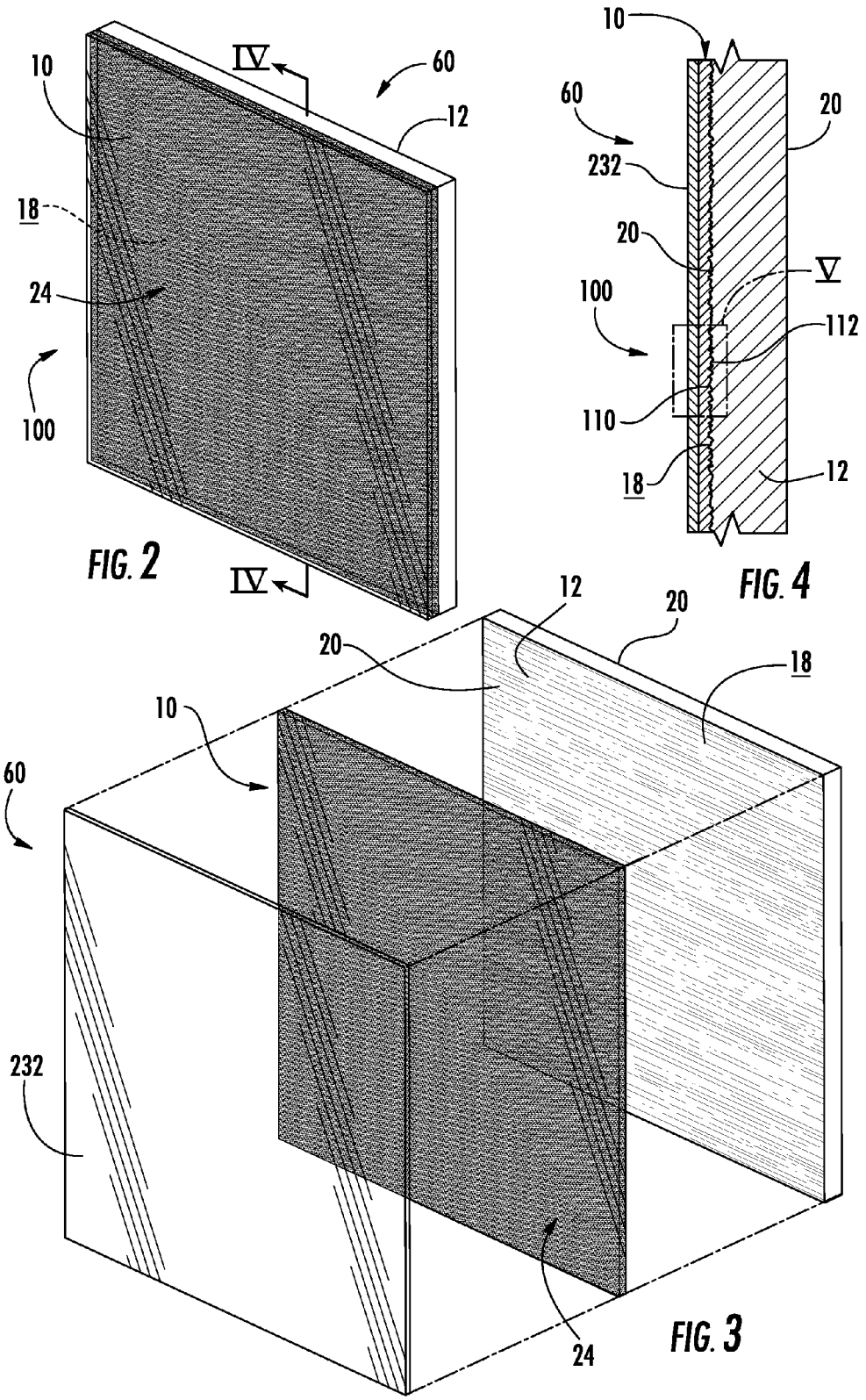

TRANSPARENT TINTED COATING FOR APPLIANCE EXTERIOR PANELS TO ALLOW FOR TINTED SURFACE PATTERNS AND A PROCESS FOR APPLICATION OF COATING

FIELD OF THE DISCLOSURE

The present disclosure generally relates to finished outer panels for kitchen appliances, and more specifically, a transparent tinted coating composition that is applied to a finished outer panel of an appliance and a process for applying such a transparent tinted coating composition to a finished outer panel for an appliance.

BACKGROUND OF THE DISCLOSURE

Coatings for metallic panels are known where such coatings are typically used for aesthetics or for utility and/or safety purposes. Conventional aesthetic coatings can be applied using a process known in the art as physical vapor deposition (PVD). This process calls for the vaporization of a metallic material and application of that vaporized material onto a surface of a metallic panel. This process can be expensive and the coating applied by PVD tends to be uneven and inconsistent.

Electrically inhibitive coatings on metal panels for safety purposes have been used on electrical boxes and other metal panels for electrical equipment and other utility fixtures, where such coatings are disposed, generally, on the back side of metallic panels. These coatings tend to provide a barrier layer or a layer of non-conductive material to prevent transmission of electricity from various electrical equipment through the outer panel and to the user. Such coatings are generally not for aesthetics and are simply a utilitarian solution to the problem of transmission of electricity. These coatings tend to be opaque and can be dark in color such that the back side of the metallic panel is not visible, but rather, only the coating is visible.

BRIEF SUMMARY OF THE DISCLOSURE

In at least one aspect, an exterior panel for a kitchen appliance includes a metallic substrate having a predetermined surface pattern on at least one side of the metallic substrate, wherein the metallic substrate is formed to include a predetermined contour. A coating layer is an organic paint coating composition on the at least one side of the metallic substrate. The coating layer includes a predetermined color and a fingerprint resistive surface, wherein the coating layer is at least partially translucent such that the predetermined surface pattern is visible with the naked eye through the coating layer. The predetermined surface pattern is modified by the coating layer to reflect the combination of the predetermined surface pattern and the predetermined color of the coating layer.

In at least another aspect, a kitchen appliance includes a metallic shaped outer metal panel having a surface texture defined on at least one side of the metallic shaped outer panel and disposed upon a kitchen appliance. The metallic shaped outer panel is formed into a predetermined shape. A tinted outer coating is a thermosetting polyester applied to the at least one side of the metallic shaped outer panel. The tinted outer coating has a thickness within the range of approximately 0.2 mils to approximately 0.6 mils. The tinted outer coating is also at least partially fingerprint resistant and at least partially translucent, wherein the surface texture is substantially visible through the tinted outer coating when viewed with the naked eye. The metallic shaped outer panel is configured to be formed into the predetermined shape after the tinted outer coating is applied to the at least one side of the metallic shaped outer panel.

In at least another aspect, a tinted outer shell for an appliance includes a frame, and a stainless steel substrate having a predetermined surface pattern defined within at least one side of the stainless steel substrate. The stainless steel substrate is one of grade 430 stainless steel and grade 201 stainless steel. The stainless steel substrate is shaped in a predetermined contour and is applied to and supported by the frame of the appliance. A coating layer, being an organic paint coating composition, is disposed on the predetermined surface pattern. The coating layer includes a thermosetting polyester and is at least partially transparent. The coating layer includes a predetermined tint that filters a predetermined wavelength of visible light that passes through the coating layer, thereby causing the predetermined surface pattern to visually define a tinted surface pattern having a different color than the predetermined surface pattern.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings, certain embodiment(s) which are presently preferred. It should be understood, however, that the disclosure is not limited to the precise arrangements and instrumentalities shown. Drawings are not necessary to scale. Certain features of the disclosure may be exaggerated in scale or shown in schematic form in the interest of clarity and conciseness.

FIG. 2 is a detail perspective view of a metal panel incorporating an aspect of the transparent tinted coating;

FIG. 3 is an exploded perspective view of the metal panel of FIG. 2;

FIG. 4 is a cross-sectional view of the metal panel of FIG. 2;

DETAILED DESCRIPTION

Figure 1:
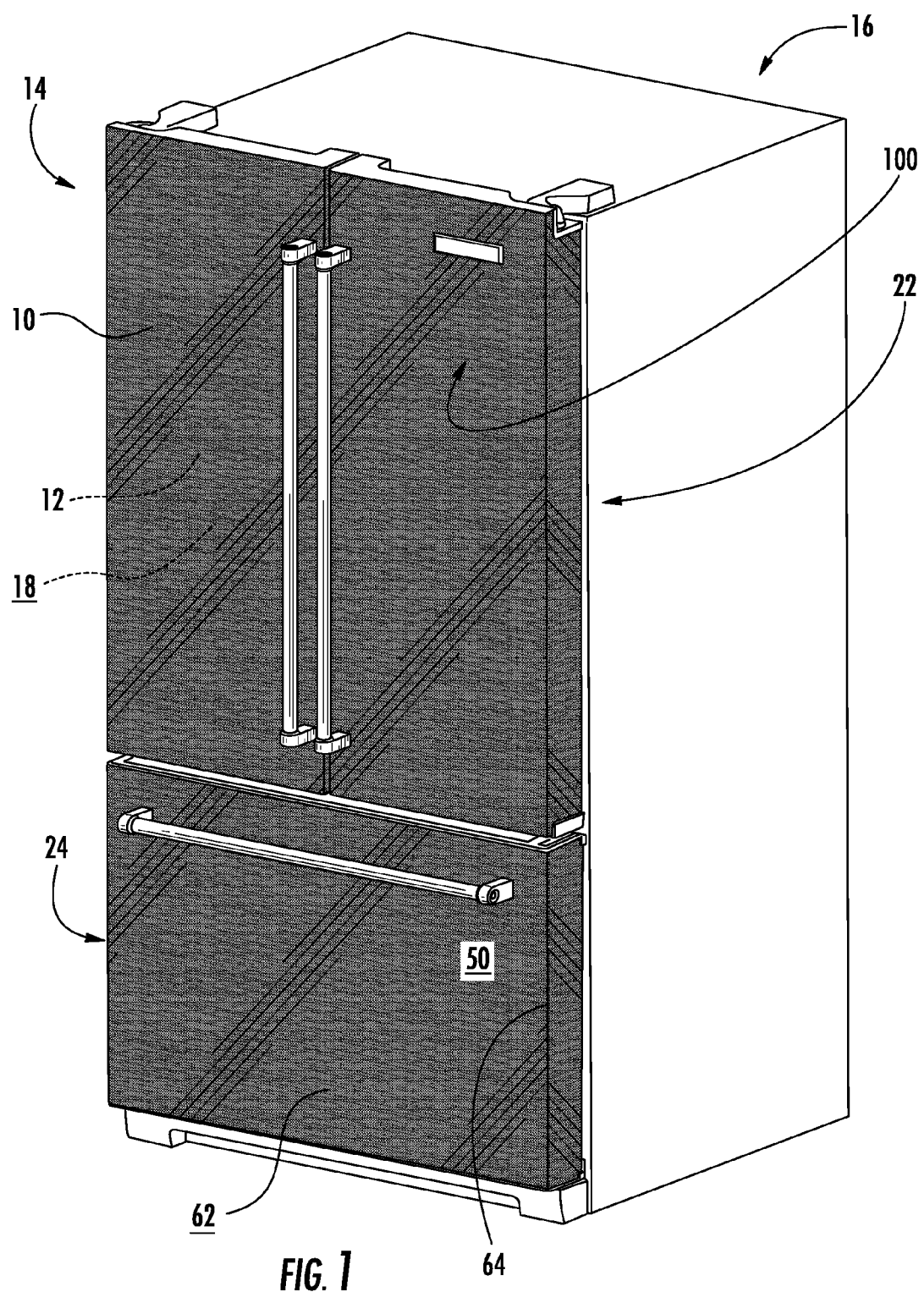
FIG. 1 is a front perspective view of an appliance incorporating an embodiment of the transparent tinted coating.

It is to be understood that the subject disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

In this specification and the appended claims, the singular forms "a," "an" and "the" include plural reference unless the context clearly dictates otherwise.

As illustrated in FIGS. 1-4, reference numeral 10 generally refers to a transparent tinted coating that is applied to a metallic substrate panel 12, such as an exterior panel 14, for installation upon an appliance 16. Such appliances 16 can include, but are not limited to, refrigerators, ovens, microwaves, washers, dryers, dishwashers, air handling equipment, food processors, countertop cooking devices, lighting fixtures, vent hoods, decorative trim, or other similar household or commercial appliances 16. The transparent tinted coating 10 can be placed upon an exterior panel 14 for such an appliance 16, where the exterior panel 14 includes the metallic substrate panel 12 having a predetermined surface pattern 18 on at least one side 20 of the metallic substrate panel 12. Thereafter, the metallic substrate panel 12 is formed to include a predetermined contour 22, shape, or other three-dimensional configuration. A coating layer, in the form of the transparent tinted coating 10 and being an organic paint coating composition 132, is disposed on the at least one side 20 of the metallic substrate panel 12 having the predetermined surface pattern 18. The layer of the transparent tinted coating 10 includes a predetermined color 24 and is at least partially fingerprint resistant. The transparent tinted coating 10, which can also be at least partially translucent (and not opaque), allows the predetermined surface pattern 18 to be visible with the naked eye through the transparent tinted coating 10. In this manner, the predetermined surface pattern 18 is visually modified by the transparent tinted coating 10 to reflect the combination of the predetermined surface pattern 18 of the metallic substrate and the predetermined color 24 of the transparent tinted coating 10. According to the various embodiments, the transparent tinted coating 10 is a thermosetting polyester that is configured to be applied by a reverse rolling mechanism 40 (shown in FIGS. 6 and 7). Additionally, the transparent tinted coating 10 is not capable of being applied by physical vapor deposition (PVD).

Referring again to the embodiments illustrated in FIGS. 1-4, the transparent tinted coating 10 allows the predetermined surface pattern 18 disposed upon the metallic substrate panel 12 to be viewed, with the naked eye, through the transparent tinted coating 10. Moreover, as a viewer of the appliance 16 is looking at the outer surface 50 of the appliance 16, the predetermined surface pattern 18 is modified to add the predetermined color 24 of the transparent tinted coating 10 to give the metallic substrate panel 12 the appearance of a colored finish in addition to having the predetermined surface pattern 18. The transparent tinted coating 10 also includes a fingerprint resistant outer surface 50. Accordingly, when a user places their hands upon the appliance 16, the transparent tinted coating 10 resists the application of fingerprints upon the outer surface 50 of the appliance 16, such that fingerprints are not substantially visible upon the outer surface 50 of the appliance 16 after being touched by a user.

Referring again to the embodiments illustrated in FIGS. 1-4, the transparent tinted coating 10 can have a thickness, when applied to the metallic substrate panel 12, within a range of from approximately 0.2 mils to approximately 0.6 mils. In various embodiments, the transparent tinted coating 10 can have a thickness within the range of from approximately 0.25 mils to approximately 0.5 mils.

According to the various embodiments, the predetermined color 24 of the transparent tinted coating 10 is provided by adding a predetermined portion of various predetermined additives that are disposed within the transparent tinted coating 10. The predetermined proportion of the predetermined additives are sufficient to allow the transparent tinted coating 10 to be at least partially translucent such that the predetermined surface pattern 18 of the metallic substrate panel 12 can be visible through the transparent tinted coating 10. The predetermined additives, according to the various embodiments, can include at least one of, but is not limited to, carbon black, tinted resin, and other various color producing additives. According to the various embodiments, other additives that are included within the transparent tinted coating 10 can include, but are not limited to, ethylene glycol monobutyl ether, aromatic naphtha in a heavy form, xylene, isophorone, diethylene glycol butyl ether, aromatic naphtha in a light form, dipropylene glycol methyl ether, various forms of trimethyl benzene, propylene glycol, monomethyl ether acetate, methyl ethyl ketone, naphthalene, ethyl benzene, n-butyl alcohol, formaldehyde, c.i. pigment black 7, cumene, various resins, combinations thereof, and other various additives.

Referring again to the embodiment illustrated in FIGS. 1-4, by way of example, and not limitation, according to various embodiments, the predetermined additive can be carbon black. The predetermined portion of carbon black disposed within various embodiments of the transparent tinted coating 10 can be within the range of approximately 0.1 percent by weight and approximately 1 percent by weight. It is contemplated that carbon black, as a predetermined additive, can have a greater or lesser proportion, by weight, within the transparent tinted coating 10. By way of example, and not limitation, the use of carbon black in the transparent tinted coating 10 can be used to provide a transparent tinted coating 10 having the general color of black, gray, or other at least partially translucent gradient of the color black. It is contemplated that various other additives can include different predetermined colors 24 or tints within the transparent coating layer, that can include, but are not limited to, bronze, pewter, gold, other generally metallic-type color, red, blue, yellow, green, as well as combinations thereof that may result in a plurality of possible predetermined colors 24. Each of these predetermined colors 24 and tints described above can be incorporated, so long as the result is that the predetermined surface pattern 18 applied to the metallic substrate panel 12 is visible, at least with the naked eye, through the transparent tinted coating 10.

In order to provide further information regarding the predetermined colors 24 that can be created by the application of the transparent tinted coating 10 to a metallic substrate panel 12, two example charts are provided. Each chart provides technical color data expressed in CIELAB format, similar to that provided by X-Rite®, Inc. of Grand Rapids, Mich. This data expresses, in numerical terms, specific colors. The first chart, labeled Example A, provides CIELAB information regarding a control metallic substrate panel 12 that is uncoated. This control metallic substrate panel 12, in this example, is labeled as "Poseidon Stainless." The Example A chart also provides CIELAB information regarding an exemplary transparent tinted coating 10 that has been applied to the "Poseidon Stainless" metallic substrate panel 12, having "Glazed Bronze" as its predetermined color 24. The chart of Example A also provides a "Δ" or delta difference set of CIELAB data illustrating the difference between the coated "Poseidon Stainless" metallic substrate panel 12 and the coated metallic panel 60 having the exemplary transparent tinted coating 10. The delta difference data is used to express the color data, as the color data under CIELAB processes is difficult to obtain as to some transparent materials. Accordingly, the delta difference information provides the technical data about the amount of color change as a result of the application of the exemplary transparent tinted coating 10, in the case of Example A, "Glazed Bronze." Also provided is the chart labeled Example B, which provides the same information as to another exemplary transparent tinted coating 10 having the predetermined color 24 of "Black Steel." The same CIELAB technical data is provided in this chart as Example B.

Example A

|  |  |  | L | a | b | C | h |
|---|---|---|---|---|---|---|---|
| Poseidon | 25° | A/10° | 25.25 | −0.10 | −0.19 | 0.21 | 242.32 |
| Stainless |  | F2/10° | 25.24 | −0.05 | −0.15 | 0.16 | 250.59 |
|  |  | F12/10° | 25.25 | −0.06 | −0.13 | 0.14 | 243.14 |
| Glazed | 25° | A/10° | 40.58 | 2.56 | 6.89 | 7.35 | 69.65 |
| Bronze |  | F2/10° | 40.56 | 1.16 | 7.34 | 7.43 | 81.05 |
|  |  | F12/10° | 40.72 | 1.76 | 7.68 | 7.88 | 77.09 |

|  |  |  | ΔL | Δa | Δb | ΔC | Δh |
|---|---|---|---|---|---|---|---|
| Delta | 25° | A/10° | 15.08 | 2.66 | 7.08 | 7.14 | −172.67 |
| Difference |  | F2/10° | 15.32 | 1.21 | 7.49 | 7.33 | −169.54 |
|  |  | F12/10° | 15.47 | 1.82 | 7.81 | 7.81 | −166.05 |

Example B

|  |  |  | L | a | b | C | h |
|---|---|---|---|---|---|---|---|
| Poseidon | 25° | A/10° | 25.25 | −0.10 | −0.19 | 0.21 | 242.32 |
| Stainless |  | F2/10° | 25.24 | −0.05 | −0.15 | 0.16 | 250.59 |
|  |  | F12/10° | 25.25 | −0.06 | −0.13 | 0.14 | 243.14 |
| Black | 25° | A/10° | 20.84 | −0.26 | −1.71 | 1.73 | 261.46 |
| Steel |  | F2/10° | 20.82 | 0.00 | −1.82 | 1.82 | 269.85 |
|  |  | F12/10° | 20.80 | −0.06 | −1.85 | 1.86 | 265.08 |

|  |  |  | ΔL | Δa | Δb | ΔC | Δh |
|---|---|---|---|---|---|---|---|
| Delta | 25° | A/10° | −4.41 | −0.16 | −1.52 | 1.52 | 19.14 |
| Difference |  | F2/10° | −4.42 | 0.05 | −1.67 | 1.66 | 19.26 |
|  |  | F12/10° | −4.45 | −0.10 | −1.72 | 1.72 | 21.94 |

While CIELAB information, similar to that provided by X-Rite®, is known, a brief explanation of the categories of information is provided. "L" refers to the lightness of the particular color. Lightness is sometimes referred to as the luminous intensity of the color. The label "a" denotes the red/green value of the color and the label "b" denotes the yellow/blue value of the color. The label "C" refers to the color's "Chroma" or "Saturation" and specifically relates to the vividness or dullness of a particular color. Finally, the label "h" refers to the color's "hue." The hue represents how we perceive the color, whether it be red, orange, green, blue, etc. As to each of the readings of the Example A and Example B charts, all readings were taken at a 25° angle, which is an example angle of application that can typically correspond to the "Glazed Bronze," the "Black Steel," and the "Poseidon Stainless Steel."

In addition to the comparative data provided below, taken from a single angle, an exemplary chart Example C is provided below. This chart Example C provides CIELAB color data for the transparent tinted coating 10 having the predetermined color 24 of "Black Steel." This information related to the example of "Black Steel" is taken at multiple angles to show how the transparent tinted coating 10 can have a different appearance depending on the viewing angle.

Example C

|  |  |  | L | a | b |
|---|---|---|---|---|---|
| Black Steel | 25° | A/10° | 20.84 | −0.26 | −1.71 |
| Master Color |  | F2/10° | 20.82 | 0.00 | −1.82 |
| Standard |  | F12/10° | 20.80 | −0.16 | −1.85 |
| Black Steel | 45° | A/10° | 13.96 | 0.40 | −0.23 |
| Master Color |  | F2/10° | 13.89 | 0.20 | −0.30 |
| Standard |  | F12/10° | 13.93 | 0.34 | −0.21 |

|  |  |  | ΔL | Δa | Δb |
|---|---|---|---|---|---|
| Black Steel | 75° | A/10° | 8.55 | 1.41 | 1.52 |
| Master Color |  | F2/10° | 8.40 | 0.62 | 1.42 |
| Standard |  | F12/10° | 8.56 | 1.09 | 1.71 |

It should be noted that the color data provided in charts Example A, Example B and Example C are only for explanation/exemplary purposes and are not included as a limitation of the predetermined color 24 of the transparent tinted coating 10 to these or other specific examples.

Referring again to FIGS. 1-4, it is contemplated that the metallic substrate panel 12 can be any one of various metals that can include, but is not limited to, stainless steel, galvanized steel, aluminum, iron, alloys thereof, combinations thereof, and other metallic materials that are capable of being coated with the transparent tinted coating 10 to form a coated metallic panel 60, but is typically a brushed stainless steel that can have texture patterns on the surface after the steel has been purchased. The metallic substrate panel 12 may also be free of texture, i.e., it may be unpatterned.

Referring again to the embodiment illustrated in FIG. 1, the predetermined contour 22 that the coated metallic substrate panel 12 is formed into can take the form of various exterior panels 14 of various appliances 16. While a refrigerator is shown in FIG. 1, it is contemplated that the coated metallic substrate panel 12 can be used on substantially any household or kitchen appliance 16 having a metallic exterior panel 14. It is contemplated that the predetermined contour 22 can include a plurality of external sides 62 that are connected by adjoining edges 64. The transparent tinted coating 10 is configured to extend over each of the external sides 62 as well as the adjoining edges 64. In order to achieve the effect of the transparent tinted coating 10 being applied over external sides 62 and adjoining edges 64 of the coated metallic panel 60 formed having the predetermined contour 22, the uncoated metallic substrate panel 12 has the transparent tinted coating 10 applied to the side 20 of the metallic substrate panel 12. In this manner, the combination of the transparent tinted coating 10 and the metallic substrate panel 12 form the coated metallic panel 60. The coated metallic panel 60 is then formed to define the predetermined contour 22. As will be discussed more fully below, the transparent tinted coating 10 can be applied to an elongated sheet of a metallic substrate material 80 (shown in FIGS. 6 and 7), such as a rolled coil 130 of the metallic substrate material 80, that is unrolled, coated, and then re-rolled for delivery to be cut and shaped into the predetermined contour 22 to form the exterior panel 14 of the appliance 16. According to various alternate embodiments, it is also contemplated that the transparent tinted coating 10 can be applied to the metallic substrate panel 12 after the metallic substrate panel 12 is shaped into the predetermined contour 22.

Referring again to the embodiment illustrated in FIGS. 1-4, in one preferred embodiment, the metallic substrate panel 12 can include a stainless steel substrate that is one of grade 430 stainless steel or grade 201 stainless steel.

Additionally, according to the various embodiments, while the term "transparent" is used to describe the transparent tinted coating 10, it is contemplated that the transparent tinted coating 10 can include ranges of transparency and translucency, depending upon the various predetermined additives included within a particular transparent tinted coating 10. By way of explanation, and not limitation, various embodiments of the transparent tinted coating 10 can be partially translucent, while various alternate embodiments of the transparent tinted coating 10 can be substantially transparent. The level of transparency and/or translucency can vary so long as the effect of the transparent tinted coating 10 being applied to the metallic substrate panel 12 results in the predetermined surface pattern 18 being visible, with the naked eye, through the transparent tinted coating 10 applied to the metallic substrate panel 12. Additionally, the visual result of the transparent tinted coating 10 being applied to the metallic substrate panel 12 is a visual combination of the tinted effect of the predetermined color 24 of the transparent tinted coating 10 and the visual effect of the predetermined surface pattern 18 applied to the metallic substrate panel 12. The result is a tinted surface pattern 100 of the coated metallic panel 60.

Referring again to FIGS. 1-5, the resulting appliance 16 that includes the coated metallic substrate panel 12 having the transparent tinted coating 10 and shaped into the predetermined contour 22 being applied or attached thereto can include a metallic shaped exterior panel 14 that includes a tinted predetermined surface pattern 18. The predetermined surface pattern 18 can be a surface texture or a predetermined surface texture that is defined in at least one side 20 of the metallic substrate panel 12, which is then coated to form the coated metallic panel 60. The metallic shaped exterior panel 14 is then disposed upon a kitchen appliance 16. A tinted outer coating, in the form of the transparent tinted coating 10, can be in the form of a thermosetting polyester. The transparent tinted coating 10 can be applied to the at least one side 20 of the metallic substrate panel 12, where the transparent tinted coating 10 includes a thickness within the range of from approximately 0.2 mils to approximately 0.6 mils. The transparent tinted coating 10 is at least partially fingerprint resistant. Additionally, while the term "transparent" is used to describe the coating, it is also contemplated that the coating disclosed herein can also be at least partially translucent, but not opaque. Accordingly, the surface texture, surface condition, or other predetermined surface pattern 18 of the metallic substrate panel 12 is substantially visible, at least with the naked eye, through the transparent tinted coating 10. In this manner, the tinted surface pattern 100 is defined by the combination of the transparent tinted coating 10 and the surface texture. Additionally, while various embodiments of the transparent tinted coating 10 are at least partially fingerprint resistant, various alternate embodiments of the transparent tinted coating may not be fingerprint resistant or may only be minimally fingerprint resistant.

Referring again to the embodiments illustrated in FIGS. 1-5, the predetermined surface pattern 18, that can take the form of a visual pattern, surface texture, or other similar predetermined surface condition can include various types of predetermined surface patterns 18 that can include, but are not limited to, a mill finish, a mechanically polished finish, a brushed finish, a patterned finish, a bead blasted finish, a shot blasted finish, an electro-polished finish, a photoresist finish, an acid etched finish, a ground finish, combinations thereof, and/or other similar predetermined surface patterns 18, textures or conditions.

Figure 5:
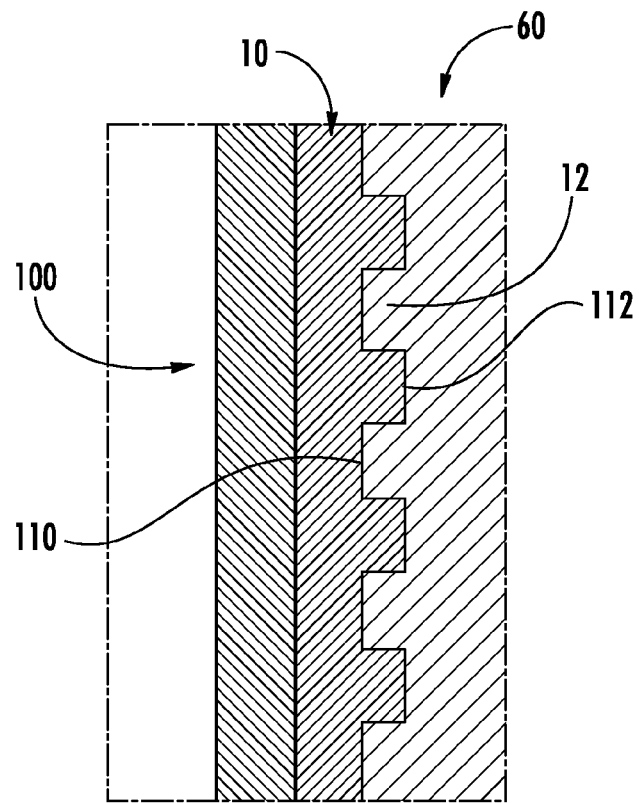
FIG. 5 is an enlarged cross-sectional view of FIG. 4 taken at area V.

In the various embodiments, as illustrated in FIGS. 4 and 5, it is contemplated that the predetermined surface pattern 18 defined on the metallic substrate panel 12 can be defined within or applied to the metallic substrate panel 12 before the transparent tinted coating 10 is applied to the side or sides 20 of the metallic substrate panel 12. In this manner, the predetermined surface pattern 18 can be defined within the side 20 of the metallic substrate panel 12, and then the transparent tinted coating 10 can be applied over the predetermined surface pattern 18.

It is contemplated that, in certain embodiments, various predetermined surface patterns 18 defined within the metallic substrate panel 12 can be stamped, etched, embossed, hammered or otherwise imprinted into the metallic substrate panel 12 to form a relief. In such an embodiment, it is contemplated that portions of the relief-type predetermined surface pattern 18 can be disposed within the coated metallic panel 60 after the transparent tinted coating 10 is applied to the metallic substrate panel 12. It is also contemplated that various combinations of the predetermined surface patterns 18 listed within this application, and other surface patterns known in the art but not listed herein, can be applied such that they appear simultaneously within the surface of the metallic substrate panel 12, and, in turn, the coated metallic panel 60.

In the various embodiments, as illustrated in FIGS. 4 and 5, it is contemplated that certain predetermined surface patterns 18 of the metallic substrate panel 12 can include a relief having raised surfaces 110 that at least partially define the predetermined surface pattern 18. In such embodiments, it is contemplated that portions of the transparent tinted coating 10 may need to be thicker in order to properly cover the entire surface of the metallic substrate panel 12 having the raised surfaces 110 within the predetermined surface pattern 18, including lower areas 112 between the raised surfaces 110. It is also contemplated that the predetermined surface pattern 18 of the metallic substrate panel 12 can be used to create a color gradient of the predetermined color 24, wherein the transparent tinted coating 10 operates in conjunction with raised surfaces 110 and lower areas 112 therebetween to enhance or accentuate the transparent tinted coating 10 and the tinted surface pattern 100. As discussed above, the tinted surface pattern 100 includes a combination of the predetermined surface pattern 18 and the transparent tinted coating 10. By way of example, and not limitation, when the transparent tinted coating 10 is applied to a relief-type predetermined surface pattern 18, the transparent tinted coating 10 may be thicker within certain portions of the predetermined surface pattern 18, such as the lower areas 112 between the raised surfaces 110. Accordingly, the predetermined color 24 reflected by the tint included within the transparent tinted coating 10 may appear darker in these lower areas 112 of the predetermined surface pattern 18.

In various alternate embodiments, it is contemplated that a relief-type predetermined surface pattern 18 disposed upon the metallic substrate panel 12 can be used to create a two-tone transparent tinted coating 10 wherein the transparent tinted coating 10 can be applied only to certain portions, such as the raised surfaces 110, of the relief-type predetermined surface pattern 18, that extend outward from the surface of the metallic substrate panel 12. A second coat of the transparent tinted coating 10, that may have the same or possibly a different predetermined color 24, can then be applied over the entire surface of the metallic substrate panel 12 to coat both the previously uncoated portions of the metallic substrate panel 12 and the previously coated portions of the metallic substrate panel 12 to create a multi-toned transparent tinted coating 10 that is applied to the metallic substrate panel 12 having the raised-type predetermined surface pattern 18. Where the multiple coats of the transparent tinted coating 10 have the same color, the application of multiple layers, or thicker coats, on certain areas of the relief-type predetermined surface pattern 18, may result in the predetermined color 24 appearing darker or bolder in the areas of the predetermined surface pattern 18 having more or thicker coats of the transparent tinted coating 10.

It is also contemplated that multiple layers of the transparent tinted coating 10 can be applied to a metallic substrate panel 12 having the relief-type predetermined surface pattern 18, wherein the transparent tinted coating 10 can be used to form a substantially smooth and even finish over the relief-type predetermined surface pattern 18, such that the texture of the predetermined surface pattern 18 is visible through the transparent tinted coating 10, but is smooth to the touch such that the predetermined surface pattern 18 can be viewed, but cannot be experienced in a tactile sense. In such an embodiment, the transparent tinted coating 10 can be used to fill the lower areas 112 of the predetermined surface pattern 18 to make the outer surface 50 of the coated metallic panel 60 substantially smooth and even.

Referring now to the embodiments illustrated in FIGS. 6-10, having described the various embodiments of the transparent tinted coating 10 placed upon the metallic substrate panel 12, described herein is an embodiment of a process for coating an exterior panel 14 for an appliance 16. According to one embodiment, the process includes the step of providing a rolled coil 130 of metallic substrate material 80. A predetermined surface condition, such as the predetermined surface pattern 18, is applied to at least one side 20 of the metallic substrate material 80.

The process also includes providing an organic paint coating composition 132, being a thermosetting polyester, where the organic paint coating composition 132 is applied by a process that is free of PVD. The rolled coil 130 of metallic substrate material 80 is then fed through a reverse rolling paint assembly 134 such that the metallic substrate material 80 is unrolled from the rolled coil 130 and fed into the reversed rolling paint assembly 134. Once fed therein, at least one layer of the organic paint coating composition 132 is reverse-rolled onto the at least one side 20 of the metallic substrate material 80. Once reverse-rolled, the organic paint coating composition 132 is cured at a predetermined temperature and for a predetermined period of time to harden the organic paint coating composition 132 into the transparent tinted coating 10 that is at least partially fingerprint resistant. As discussed above, the transparent tinted coating 10 is at least partially transparent such that the predetermined surface pattern 18 of the metallic substrate material 80 is visible through the transparent tinted coating 10, at least with the naked eye. The transparent tinted coating 10 includes a predetermined color 24 or tint that visually modifies the predetermined surface pattern 18. The modification of the predetermined surface pattern 18 reflects the combination of the predetermined surface pattern 18 and the predetermined color 24 of the transparent tinted coating 10 to define a tinted surface pattern 100 or condition disposed upon the metallic substrate material 80.

The metallic substrate material 80 having the tinted surface pattern 100 can then be cut to form the coated metallic panels 60. The coated metallic panels 60 can then be formed into the predetermined contour 22 to form the exterior panel 14 that will be disposed on the appliance 16. The shaped exterior panel 14, having the tinted surface pattern 100 and the predetermined contour 22 is then applied to an appliance 16 to serve as the exterior panel 14 for the appliance 16.

According to the various embodiments, the process can also include the step of pretreating the at least one side 20 of the metallic substrate material 80, wherein the step of pretreatment occurs before the step of reverse rolling the organic paint coating composition 132 onto the metallic substrate material 80 to form the coated metallic panel 60. The pretreating steps are designed to remove dust, dirt, foreign material and other debris from the side 20 of the metallic substrate material 80 to be coated with the organic paint coating composition 132. The pretreating step can include at least one cleaning stage and at least one rinsing stage. Various inspection stages can also be included during pretreatment. It is also contemplated that the pretreatment step of the process for coating the exterior panel 14 for an appliance 16 can also include applying a pretreatment coating 140 and drying the pretreatment coating 140 onto the at least one side 20 of the metallic substrate material 80. In such an embodiment, the pretreatment coating 140 can be configured to directly receive the organic paint coating composition 132 that, when cured, forms the transparent tinted coating 10.

Referring again to FIGS. 6-10, the process for coating an exterior panel 14 can also include the step of re-rolling the coated metallic panel 60 after the organic paint coating composition 132 is cured to form the transparent tinted coating 10. Where such a step is included, the rerolled coated metallic panel 60 can be delivered to a separate site for performing the cutting and/or forming steps of the process at a different location than where the metallic substrate material 80 is run through the reverse rolling paint assembly 134.

Referring again to the embodiment illustrated in FIGS. 6-10, it is contemplated that the steps of reverse rolling the organic paint coating composition 132 and curing the organic paint coating composition 132 can define a coating application process. According to the various embodiments, the coating application process can be repeated a predetermined number of times in order to achieve the predetermined color 24 of the transparent tinted coating 10 and also the desired thickness. Each coating application process can be performed by a separate coating application portion 160 of the reverse rolling paint assembly 134. In such an embodiment, each coating application portion 160 of the reverse rolling paint assembly 134 is positioned sequentially along the path of the reverse rolling paint assembly 134.

According to the various embodiments, it is contemplated that the desired predetermined color 24 of the transparent tinted coating 10 can require a thickness that is greater than about 0.6 mils or less than about 0.2 mils. It is further contemplated that the exact thickness of the transparent tinted coating 10 can vary so long as the predetermined surface pattern 18 of the coated metallic panel 60 is visible, at least with the naked eye, through the transparent tinted coating 10 applied to the metallic substrate material 80. It is also contemplated that each coating application process can be followed by, or can include, a quenching step, wherein the metallic substrate material 80 and the transparent tinted coating 10, or a portion of the transparent tinted coating 10, are cooled to a predetermined temperature. The quenching step can be performed within a quenching apparatus 170 included within the various coating application portions 160 of the reverse rolling paint assembly 134. The predetermined temperature obtained through the various quenching steps of the process can be approximately equal to room temperature or a temperature that is substantially cool to the touch. According to the various embodiments, it is contemplated that the coating application process can be repeated, typically, at least two times, and according to some embodiments, can be repeated four times, or more.

According to the various embodiments, the various coating application processes that are conducted during the application of the transparent tinted coating 10 can be of a single organic paint coating composition 132 having the same predetermined color 24 that is repeated during each coating application process. According to various alternate embodiments, it is contemplated that more than one organic paint coating composition 132, that may have different predetermined colors 24 can be applied during successive coating application processes by successive coating application portions 160 of the reverse rolling paint assembly 134. In such an embodiment, a plurality of predetermined colors 24 can be layered on top of one another, as was described above, in order to achieve a multi-tone transparent tinted coating 10 or a transparent tinted coating 10 having a final predetermined color 24 that is different than, or a color additive combination of, the respective predetermined colors 24 for each individual layer of the organic paint coating composition 132 applied during each successive coating application process.

Referring again to the embodiments illustrated in FIGS. 6-10, after the transparent tinted coating 10 is applied to the metallic substrate material 80, the process can include an additional step of applying a protective laminate to the outer surface 50 of the coated metallic panel 60. It is contemplated that the laminate may not have its own predetermined color 24 but may be a clear material that does not modify the predetermined color 24 of the transparent tinted coating 10 of the coated metallic panel 60.

Figure 6:
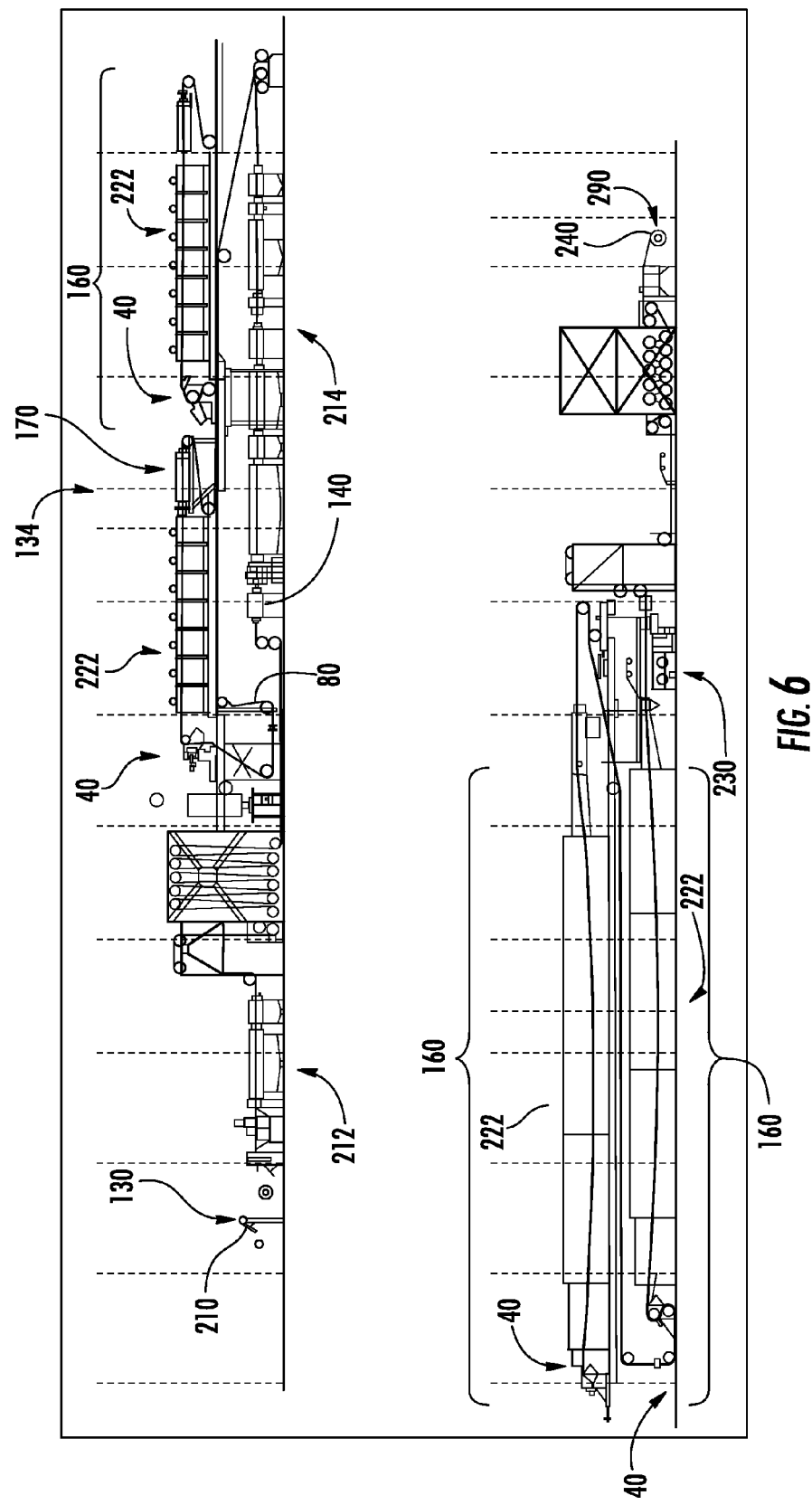
FIG. 6 is a schematic diagram illustrating the coating assembly for applying the transparent tinted coating onto a metal panel, according to one embodiment.

Referring again to the embodiment illustrated in FIG. 6, it is contemplated that the metallic substrate material 80 that is fed into the reverse rolling paint assembly 134 can be a substantially continuous sheet of metallic substrate material 80 that is unrolled from the rolled coil 130 and delivered continuously through the reverse rolling paint assembly 134. It is also contemplated that in the various embodiments, the substantially continuous sheet of metallic substrate material 80 can be any one of various metallic materials described above.

Referring again to FIG. 6, the reverse rolling paint assembly 134 can include a linear assembly through which a continuous sheet of the metallic substrate material 80 is fed. The reverse rolling paint assembly 134 can include an uncoiler 210 that removes the coiled metallic substrate material 80 from the rolled coil 130 to be fed into the reverse rolling paint assembly 134. The pretreatment stages of the process can be conducted in a cleaning portion 212 and, in some instances, a separate pretreatment portion 214. In the various embodiments, the cleaning, rinsing and pretreatment coating portions of the pretreatment stage can occur in separate portions of the reverse rolling paint assembly 134. It is also contemplated that these portions of the pretreatment stage can occur in a single portion of the reverse rolling paint assembly 134.

Referring again to FIG. 6, the coating application portions 160 of the reverse rolling paint assembly 134 are generally positioned sequentially so that each coating application process can occur successively within a single continuous system or line. In this manner, each coating application portion 160 of the reverse rolling paint assembly 134 includes its own reverse rolling mechanism 40 and its own dedicated curing station 222, such as an oven, heater, baking device, or other heating portion, where the applied organic paint coating composition 132 can be cured and hardened into at least a portion of the final transparent tinted coating 10 before proceeding to the next coating application portion 160.

As illustrated in FIG. 6, the particular embodiment of the reverse rolling paint assembly 134 includes four coating application portions 160. It is contemplated that the reverse rolling paint assembly 134 can be configured such that certain coating application portions 160 can remain idle, when not needed for applying a particular organic paint coating composition 132 to the metallic substrate material 80. It is also contemplated that more than four coating application portions 160 can be included in a single reverse rolling paint assembly 134. The reverse rolling paint assembly 134 can also include a laminator 230 for applying the protective laminate coating 232 (shown in FIGS. 2-5) to the outer surface 50 of the coated metallic panel 60. In various embodiments, it is contemplated that the laminating step can be omitted.

Referring again to FIG. 6, the reverse rolling paint assembly 134 can also include a recoiler 240 that places the coated metallic panel 60 back onto a rolled coil 130, such as a delivery coil 290, for delivery to a different location for cutting, forming and assembly of the coated metallic substrate material 80 so that it can be installed onto an appliance 16.

Figure 7:
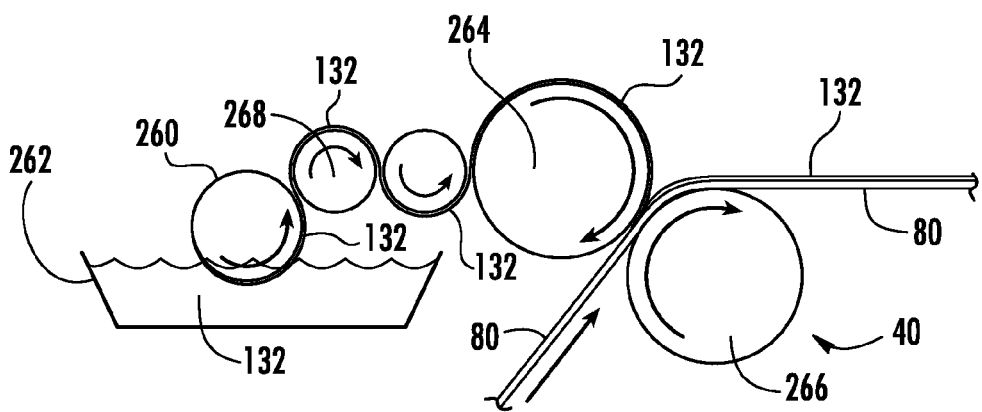
FIG. 7 is a schematic diagram illustrating the reverse rolling assembly for applying the transparent tinted coating onto a metal panel, according to one embodiment.

Referring again to the embodiment illustrated in FIGS. 6 and 7, the reverse rolling paint assembly 134 applies the organic paint coating composition 132 through a reverse rolling paint process, wherein a reverse rolling mechanism 40 having a plurality of rollers applies a specified thickness of the organic paint coating composition 132. The reverse rolling paint assembly 134, for each coating application process, can include a separate reverse rolling mechanism 40.

The reverse rolling mechanism 40, illustrated in the embodiment of FIG. 7, can include a pick-up roll 260 that is configured to pick-up the organic paint coating composition 132 from a reservoir 262 or other source of the organic paint coating composition 132. The pick-up roll 260 then transfers a portion of the organic paint coating composition 132 to an applicator roll 264 that applies the organic paint coating composition 132 in a predetermined thickness to at least one side 20 of the metallic substrate material 80. The metallic substrate material 80 is fed through the reverse rolling mechanism 40 by a back-up roll 266. Between the pick-up roll 260 and the applicator roll 264, the reverse rolling mechanism 40 can include one or more intermediate rollers 268 that are configured to proportion the amount of the organic paint coating composition 132 that is delivered to the applicator roll 264 such that once the applicator roll 264 engages the metallic substrate material 80, the desired thickness of uncured organic paint coating compositions 132 can be applied consistently and accurately. One of the primary features of the reverse rolling mechanism 40 is that the applicator roll 264 rotates in the opposing direction of the metallic substrate material 80 delivered over the back-up roll 266. Accordingly, the applicator roll 264, instead of rolling with the metallic substrate material 80, rolls across the side 20 of the metallic substrate material 80 having the predetermined surface pattern 18 to deliver the organic paint coating composition 132 to the surface of the metallic substrate material 80. This engagement between the applicator roll 264 and the back-up roll 266 carrying the metallic substrate material 80 provides a consistent and even coat of the organic paint coating composition 132 being applied to the metallic substrate material 80. It is contemplated that as the organic paint coating composition 132, being a thermosetting polyester paint composition, is applied to at least one side 20 of the metallic substrate material 80. The thickness of the uncured organic paint coating composition 132 can be within a range of from approximately 0.8 mils and approximately 1.2 mils. It is contemplated that depending upon the exact composition of the organic paint coating composition 132, the thickness of the uncured organic paint coating composition 132 can be thicker than 1.2 mils or thinner than 0.8 mils.

Figure 8:
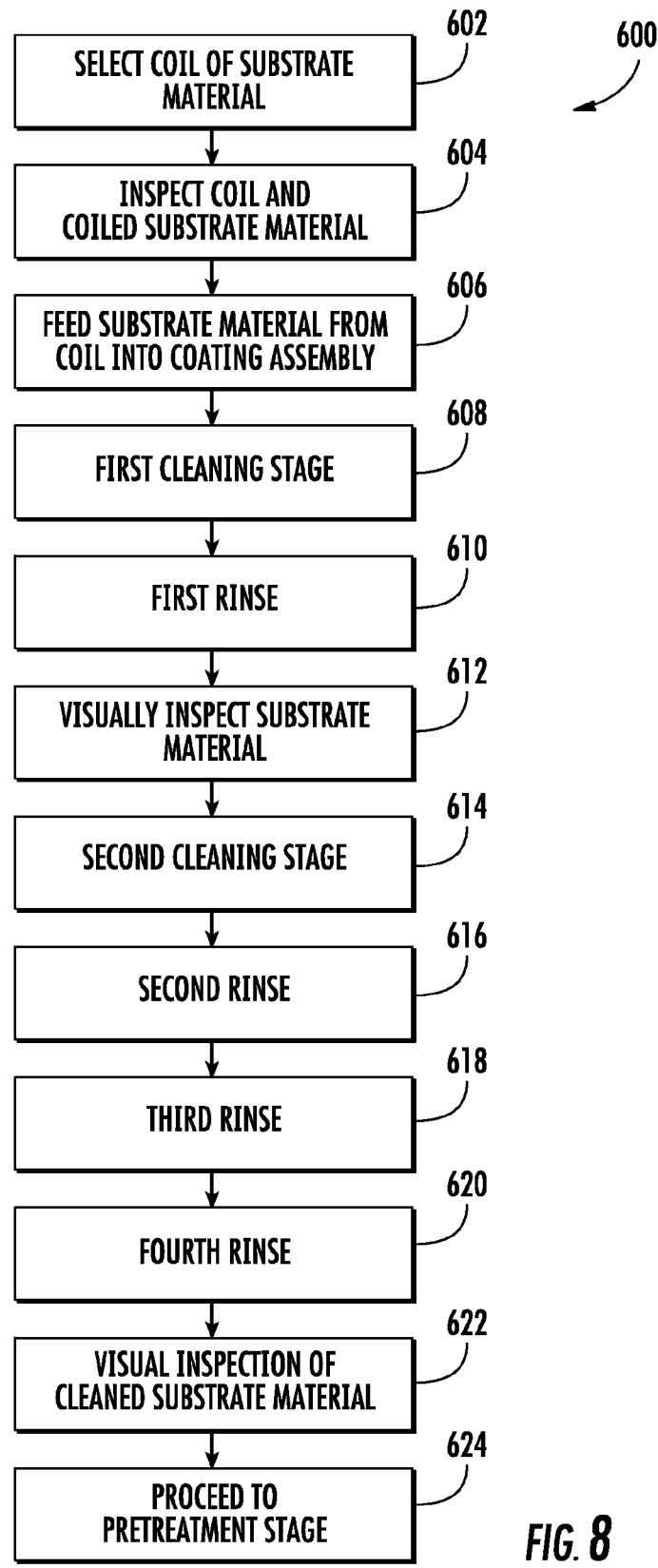
FIGS. 8 and 9 are a schematic flow diagram illustrating a process for coating an exterior panel for an appliance with the transparent tinted coating, according to one embodiment of such a process.
Figure 9:
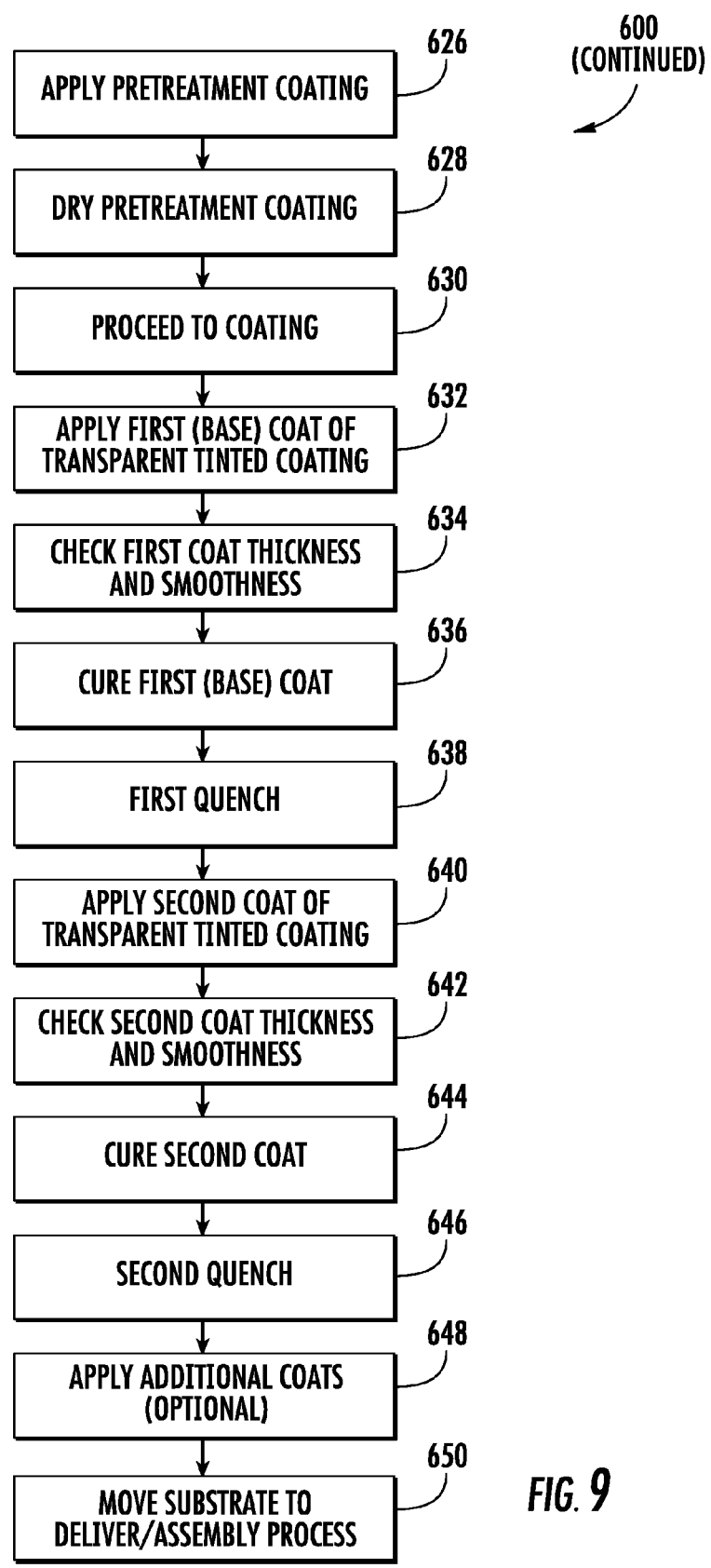
Figure 10:
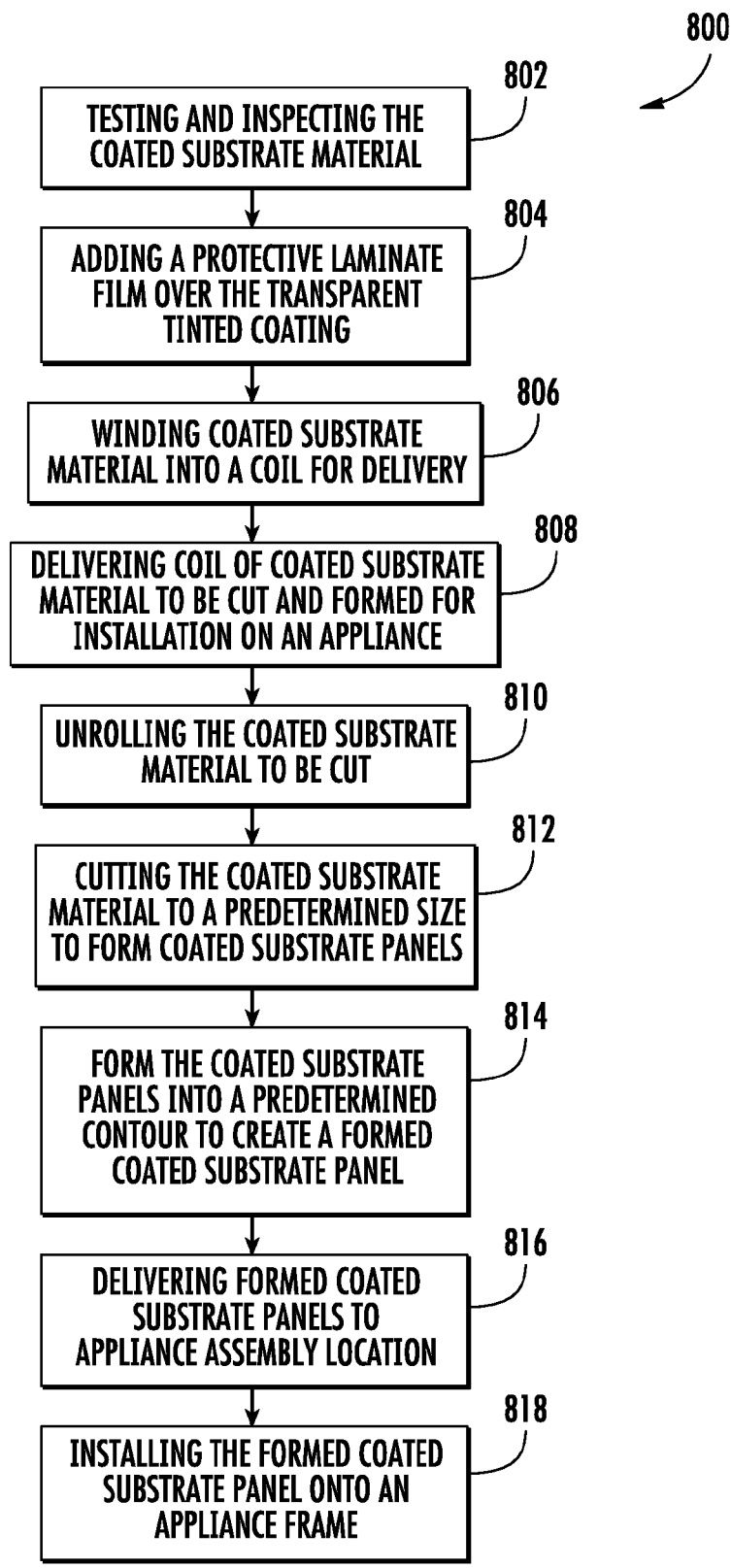
FIG. 10 is a schematic flow diagram illustrating a process for installing a metallic substrate panel having a transparent tinted coating thereon onto an appliance, according to one embodiment.

Referring now to the embodiments illustrated in FIGS. 8-10, another embodiment of the process 600 for coating an exterior panel 14 for an appliance 16, which can also be a process for manufacturing a shaped tint-coated outer panel, can include the step of selecting a rolled coil 130 of metallic substrate material 80 (step 602), such as a rolled coil 130 of a stainless steel substrate material 80. Once selected, the rolled coil 130 of metallic substrate material 80 can be inspected to determine whether the gauge and width of the metallic substrate material 80 are correct based upon the needs of the particular exterior panel 14 for the appliance 16 (step 604). An additional inspection can include a visual inspection of the metallic substrate material 80 to determine if any imperfections, damage, or other unwanted portion of the metallic substrate material 80 exists within the rolled coil 130 of metallic substrate material 80.

Once inspected, the metallic substrate material 80 can be fed into the reverse rolling paint assembly 134 (step 606) and put through the cleaning portion 212 to perform a first cleaning stage (step 608). During the cleaning stage, the material used to clean may be held at a predetermined temperature and a predetermined alkalinity in order to properly clean the metallic substrate material 80 to prepare the metallic substrate material 80 to receive the organic paint coating composition 132. After the first cleaning stage, the metallic substrate material 80 goes through a first rinse stage (step 610) where the cleaning material is removed from the metallic substrate material 80. Once rinsed, the metallic substrate material 80 can go through a second visual inspection (step 612) to determine whether the cleaning composition has been removed or whether any damage has been done to the metallic substrate material 80 during the first cleaning or first rinse stages.

After the visual inspection, the metallic substrate material 80 is sent through a second cleaning stage (step 614) to further clean the metallic substrate material 80. As with the first cleaning stage, the cleaning compound is tested to insure that a predetermined temperature and predetermined alkalinity are achieved by the cleaning material as it is used to clean the metallic substrate material 80. Once the second cleaning stage is done, a second rinsing stage is conducted (step 616) to remove the cleaning material of the second cleaning stage. After the second rinsing stage, the metallic substrate material 80 is again visually inspected to determine whether any of the cleaning material remains upon the metallic substrate material 80 or whether any damage was caused during the performance of either the first or second rinsing stages.

Referring again to the embodiments illustrated in FIG. 8, it is contemplated that the metallic substrate material 80 can go through subsequent rinsing stages, such as third and fourth rinsing stages (steps 618 and 620) to insure that the cleaning material is completely removed from the side or sides 20 of the metallic substrate material 80 having the predetermined surface pattern 18. The cleaned and rinsed metallic substrate material 80 is again inspected (step 622) and sent on to the pretreatment stage (step 624).

Referring again to the embodiments illustrated in FIG. 9, once the cleaning and rinsing stages of the process are completed, a pre-treatment stage can be performed upon the surface of the metallic substrate material 80 within the pretreatment portion 214 of the reverse rolling paint assembly 134. The pre-treatment compound can be tested to insure that the pretreatment compound has a predetermined concentration and a predetermined coating weight as it is applied to the metallic substrate material 80 (step 626). Once the pretreatment composition is applied at the predetermined concentration and predetermined coating weight, the pretreatment compound is dried at a predetermined temperature (step 628). According to the various embodiments, the predetermined surface pattern 18 of the metallic substrate material 80 can be applied before the pretreating steps. It is also contemplated that the pretreatment steps can serve to at least partially define the predetermined surface pattern 18 applied to the metallic substrate material 80. It is further contemplated that the pretreatment composition and the application of the pretreatment composition can add various portions of the predetermined surface pattern 18 to the side 20 of the metallic substrate material 80.

After the pretreatment compound is dry, the metallic substrate material 80 is moved to the coating application portions 160 of the reverse rolling paint assembly 134 (step 630). As the base coat of the organic paint coating composition 132 is applied by the reverse rolling mechanisms 40 (step 632), the organic paint coating composition 132 is tested to determine whether the appropriate wet thickness as well as the appropriate dry thickness of the organic paint coating composition 132 is achieved. The smoothness of the organic paint coating composition 132 is also monitored (step 634). It is contemplated that the speed at which the organic paint coating composition 132 is applied can be adjusted to achieve the desired smoothness of the organic paint coating composition 132. Once the organic paint coating composition 132 is applied, the organic paint coating composition 132 is oven cured (step 636) at a predetermined temperature. Once cured, the at least partially painted coated metallic panel 60 having the base coat of the transparent tinted coating 10 applied thereto is quenched to the point that the transparent tinted coating 10 is cool to the touch (step 638). The application of the organic paint coating composition 132 can be performed a plurality of times, in the form of a base coat, top coat and other intermediate coats until the desired surface conditions of the coated metallic panel 60 are achieved. It is also contemplated that both sides 20 of the metallic substrate material 80 can be coated with the organic paint coating composition 132. Although, it is contemplated that only one side 20 of the metallic substrate material 80 will receive the organic paint coating composition 132, the pretreatment steps discussed previously (steps 626 and 628) may serve as a corrosion inhibitor that may prolong the life of the exterior panel 14 of the appliance 16.

Referring again to the embodiments illustrated in FIGS. 8-9, after the pretreatment process is completed, and before the metallic substrate material 80 is fed into the coating application portions 160 of the reverse rolling paint assembly 134, the metallic substrate material 80 is again inspected and tested to determine that no discernible defects or other unacceptable imperfections exist within the surface of the metallic substrate material 80. Such tests of the pretreated metallic substrate material 80 can include visual tests, color tests, gloss tests, thickness tests, methyl ethyl ketone (MEK) rub tests, ball cup tests, t-bent tests, and other similar tests. Once these tests are complete, the metallic substrate material 80 is submitted through the first reverse rolling mechanism 40 to conduct the first of a plurality of coating application processes that include a step of reverse rolling the organic paint coating composition 132 and curing the organic paint coating composition 132. Each coat of the organic paint coating composition 132 that is applied during each coating application process (step 640) is tested to determine that it has the correct wet thickness, dry thickness, and smoothness as it is applied by the various reverse rolling mechanisms 40 during each coating application process. Once the appropriate thickness and smoothness are achieved (step 642), the organic paint coating composition 132 is heat cured (step 644) to form the transparent tinted coating 10 on the coated metallic panel 60. It is contemplated that the curing within each coating application process can occur at a temperature within the range of from approximately 440 degrees Fahrenheit to from approximately 500 degrees Fahrenheit. Such curing can occur over a time period within the range of approximately 20 seconds to approximately 45 seconds to form the transparent tinted coating 10, or a portion of the transparent tinted coating 10. It is also contemplated that the temperatures below 440 degrees Fahrenheit or above 500 degrees Fahrenheit can be used for time periods of less than 20 seconds or greater than 45 seconds to achieve the desired hardness of the layer or layers of the transparent tinted coating 10. It is contemplated that these temperatures and times can change depending upon the thickness of each layer of the organic paint coating composition 132 that is applied to the metallic substrate material 80.

As discussed above, each coating application process is followed by a quenching step (step 646), wherein the transparent tinted coating 10, or portion of the transparent tinted coating 10 is cooled to a point where it is cool to the human touch. After being quenched, the at least partially painted coated metallic panel 60 is submitted to the subsequent coating application process or processes for application of additional layers of the organic paint coating composition 132 (step 648). Once the final quenching step has occurred, the coated metallic panel 60 is moved to the delivery/assembly process (step 650). In this step of the process, the coated metallic panel 60 can be tested, according to the various inspections and tests described above, to determine whether the quantity and quality of the transparent tinted coating 10 is within the predetermined parameters desired for the exterior panel 14 of the appliance 16 (step 802, shown in FIG. 10). If desired, a protective laminate film can also be applied over at least a portion of the transparent tinted coating 10 (step 804). Once the coated metallic panel 60 goes through all of the quality inspection and testing, the coated metallic panel 60 is wound onto a delivery coil 290 and delivered to another location (step 806 and 808). Typically, the other location is an entirely different manufacturing facility where the appliances 16 are manufactured or the exterior of the appliance(s) 16 are manufactured. The delivery coil 290 is typically shipped to the other location.

Referring now to FIG. 10, after being recoiled, the coated metallic panel 60 material is unrolled and then cut using a cutting assembly into the predetermined dimensions for use in various external panels of a wide variety of appliances 16 (steps 810 and 812). Once cut, each individual panel defines one of the metallic substrate panels 12. Each of the metallic substrate panels 12 is then formed into a predetermined shape to form a shaped and coated exterior panel 14 (step 814). Once formed, the shaped and tint-coated outer panel, or the shaped and coated exterior panel 14 is then delivered to a separate assembly line (step 816) and applied to a particular appliance 16 (step 818) that it was designed to be attached to.

According to the various embodiments, it is contemplated that the steps described above can occur in a different order or can occur simultaneously to achieve the same quantity and quality of the transparent tinted coating 10 for the exterior panel 14 of the appliance 16. The various steps and order of the steps can be determined based upon the exact composition of the organic paint coating composition 132 and the desired thickness of each layer of the organic paint coating composition 132 to be applied during the various paint coating application process steps included within the entire process 600 for coating the exterior panel 14 of an appliance 16.

Within this disclosure, where the term "predetermined" is used with respect to various features, the use of the term predetermined is meant to contemplate the selection or performance of an aspect of this disclosure either before the implementation of the various processes described herein or during the implementation of any one or more of the processes described herein.

The invention claimed is:

1. An exterior panel for an appliance, the exterior panel comprising:
a metallic substrate having a surface pattern on at least one side of the metallic substrate, wherein the metallic substrate is formed to include a predetermined contour; and
a coating layer being a thermosetting organic paint coating composition on the at least one side of the metallic substrate, the coating layer including a selected color, wherein the coating layer is at least partially translucent such that the surface pattern is visible with a naked eye through the coating layer, and wherein the surface pattern is modified by the coating layer to reflect a combination of the surface pattern and the selected color of the coating layer, and wherein the metallic substrate is grade 201 stainless steel, wherein the predetermined color of the coating layer is provided by a selected proportion of at least one additive disposed within the coating layer, wherein the selective proportion of the at least one additive is sufficient to allow the coating layer to be at least partially translucent, but not opaque, and wherein the at least one additive includes at least one of carbon black and tinted resin, and wherein the predetermined color includes at least two colors, wherein each of the at least two colors are separately visible within a common portion of the predetermined contour from distinct viewing angles.

2. The exterior panel of claim 1, wherein the predetermined contour includes a plurality of external sides that are connected at adjoining edges, and wherein the coating layer extends over each of the plurality of external sides and the adjoining edges, and wherein the coating layer is deposited onto the at least one side of the metallic substrate in a manner free of physical vapor deposition.

3. The exterior panel of claim 1, wherein the coating layer has a thickness of within a range of from approximately 0.2 mils to approximately 0.6 mils.

4. The exterior panel of claim 1, wherein the coating layer is a thermosetting polyester configured to be applied by a reverse rolling mechanism.

5. The exterior panel of claim 1, wherein the coating layer has a thickness of within a range of from approximately 0.25 mils to approximately 0.5 mils.

6. The exterior panel of claim 1, wherein the at least one additive is carbon black and the proportion of carbon black disposed within the coating layer is within a range of from approximately 0.1 percent by weight and approximately 1 percent by weight.

7. A kitchen appliance comprising:
a metallic shaped outer metal panel including a surface texture defined on at least one side of the metallic shaped outer panel and disposed upon a kitchen appliance, wherein the metallic shaped outer panel is formed into a predetermined shape; and
a tinted outer coating being a thermosetting polyester applied to the at least one side of the metallic shaped outer panel, the tinted outer coating having a thickness within a range of from approximately 0.2 mils to approximately 0.6 mils, wherein the tinted outer coating is at least partially translucent, wherein the surface texture is substantially visible through the tinted outer coating such that the surface texture is visible through the tinted outer coating when viewed with a naked eye, wherein the metallic shaped outer panel is configured to be formed into the predetermined shape after the tinted outer coating is applied to the at least one side of the metallic shaped outer panel, wherein the tinted outer coating includes at least two colors, wherein each of the at least two colors are separately visible within a common portion of the metallic shaped outer panel from distinct viewing angles.

8. The kitchen appliance of claim 7, wherein the metallic shaped outer panel is a stainless steel substrate that is one of grade 430 stainless steel and grade 201 stainless steel, and wherein the tinted outer coating is at least partially fingerprint resistant.

9. The kitchen appliance of claim 7, wherein the predetermined shape includes a plurality of external sides that are connected at adjoining edges, and wherein the tinted outer coating extends over each of the plurality of external sides and the adjoining edges, and wherein the tinted outer coating is not capable of being physical vapor deposited onto the at least one side of the metallic shaped outer panel.

10. The kitchen appliance of claim 7, wherein the tinted outer coating includes a predetermined additive, and wherein the predetermined additive includes at least one of carbon black and tinted resin.

11. The kitchen appliance of claim 10, wherein the predetermined additive is carbon black and a proportion of carbon black disposed within the tinted outer coating is within a range of from approximately 0.1 percent by weight and approximately 1 percent by weight.

12. A tinted outer shell for an appliance comprising:
an appliance having a frame;
a stainless steel substrate having a predetermined surface pattern defined within at least one side of the stainless steel substrate, and wherein the stainless steel substrate is one of grade 430 stainless steel and grade 201 stainless steel, wherein the stainless steel substrate is shaped in a predetermined contour and is applied to and supported by the frame of the appliance; and
a coating layer, being an organic paint coating composition, disposed on the predetermined surface pattern, the coating layer including a thermosetting polyester and being at least partially transparent, wherein the coating layer includes a predetermined tint that filters a predetermined wavelength of visible light, thereby causing the predetermined surface pattern to visually define a tinted surface pattern having a different color than the predetermined surface pattern, wherein the predetermined tint includes at least two colors, wherein each of the at least two colors are separately visible within a common portion of the tinted surface pattern from distinct viewing angles.

13. The tinted outer shell of claim 12, wherein the coating layer is deposited onto the at least one side of the stainless steel substrate in a manner free of physical vapor deposition.

14. The tinted outer shell of claim 12, wherein the coating layer has a thickness of within a range of approximately 0.2 mils to approximately 0.6 mils.

15. The tinted outer shell of claim 12, wherein the predetermined tint of the coating layer is provided by a predetermined proportion of a predetermined additive disposed within the coating layer, wherein the predetermined proportion of the predetermined additive is sufficient to allow the coating layer to be at least partially translucent, and wherein the predetermined additive includes at least one of carbon black and tinted resin.

16. The tinted outer shell of claim 15, wherein the predetermined additive is carbon black and a predetermined proportion of carbon black disposed within the coating layer is within a range of from approximately 0.1 percent by weight and approximately 1 percent by weight.

17. The tinted outer shell of claim 12, wherein the coating layer has a thickness of within a range of from approximately 0.25 mils to approximately 0.5 mils, and wherein the coating layer is configured to be applied by a reverse rolling mechanism.

* * * * *